Figure 1:
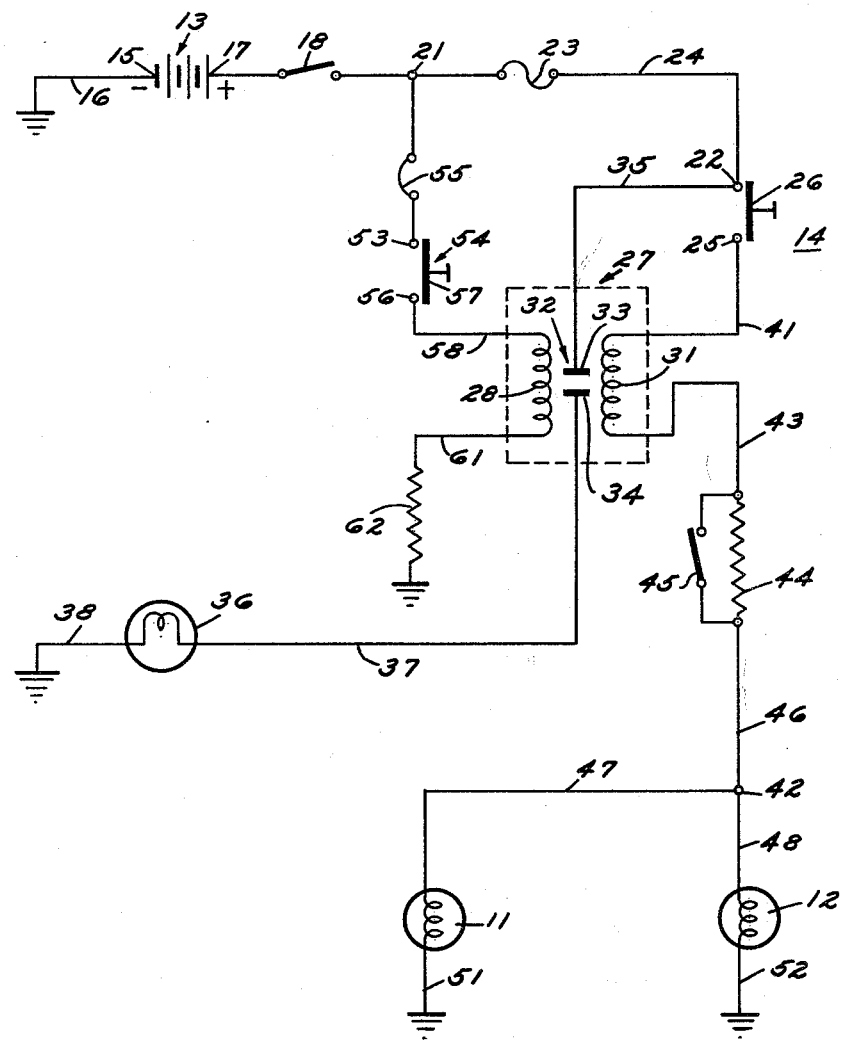

JAMES W. MURRAY
LAWRENCE B. WARD
INVENTORS

BY John R. Faulkner
Keith L. Zerschling
ATTORNEYS

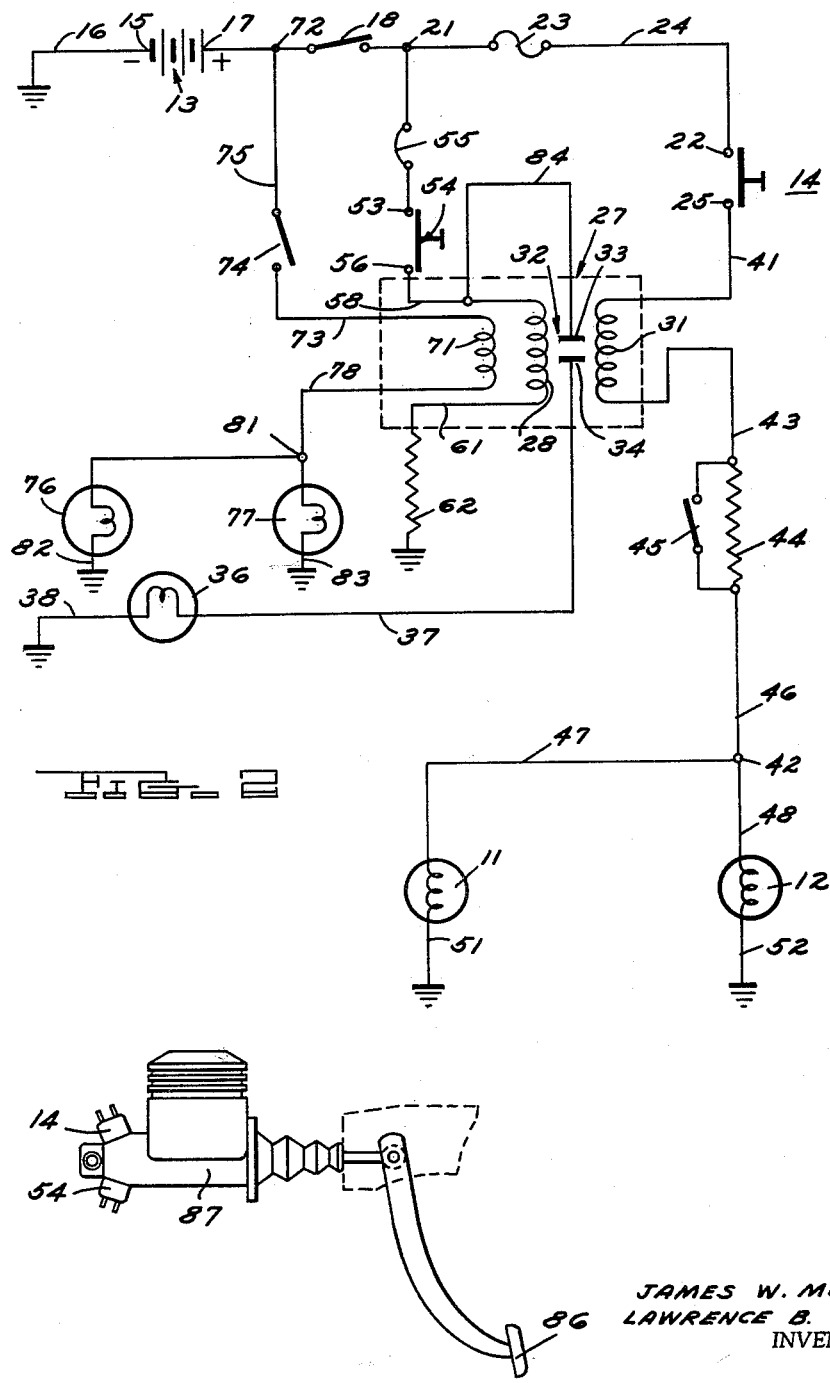

United States Patent Office 3,171,096
Patented Feb. 23, 1965

3,171,096
AUTOMOBILE LAMP SAFETY CIRCUIT
James W. Murray, Dearborn, and Lawrence B. Ward, Milan, Mich., assignors to Ford Motor Company, Dearborn, Mich., a corporation of Delaware
Filed Dec. 3, 1962, Ser. No. 241,819
7 Claims. (Cl. 340—69)

This invention relates to an automobile lamp safety circuit and more particularly to an indicating circuit for indicating failure of the stop lamps of an automotive vehicle and for indicating the failure of the stop lamp switch that actuates these stop lamps.

In present day automotive vehicles a pair of stop lamps are located at the rear of the vehicle. These stop lamps are actuated by a switch that is closed when the brake pedal is depressed. Ordinarily these switches are hydraulically operated from the master cylinder of the brake system. Should one or the other, or both, of the stop lamps fail for any reason the driver of the vehicle has no way of knowing this fact. This becomes a dangerous situation since drivers to the rear of the vehicle rely on the energization of the stop lamps to warn them when the vehicle is decelerating or coming to a stop.

The present invention is designed to indicate to the vehicle driver when the stop lamps are open circuited or have failed because the filaments have burned out. In addition, provision is made for indicating a failure of the stop lamp switch that actuates these lamps. This switch may fail in either the open or the closed position. When it fails in the closed position so that it remains permanently closed, the stop lamps will be continuously energized thereby providing a false indication to the drivers at the rear of the vehicle. Also, the stop lamp switch could fail in the open position in which case it would not close the circuit to the stop lamps when the brake pedal is depressed and the stop lamps would not be energized. The present invention provides a means for indicating to the driver when the stop lamp switch fails in either the open or the closed position.

The invention also includes a means for interrogating or proving out the circuit described above. In this case, a switch mechanism may be actuated by the driver to energize the indicating means prior to the vehicle being driven so that any failure in the indicating circuit itself may be checked prior to operation.

An object of the present invention is the provision of an automobile lamp safety circuit in which an indication or warning is given when a stop lamp of an automobile fails to be energized upon actuation of a stop lamp switch.

Another object of the invention is the provision of an automobile lamp safety circuit in which an indication or warning is given when a stop lamp switch fails in either the open or the closed position.

A further object of the invention is the provision of an automobile lamp safety circuit in which an indication or warning is given when a stop lamp of an automobile fails to be energized upon actuation of a stop lamp switch and also gives an indication when the stop lamp switch fails in either the open or the closed position.

Another object of the invention is the provision of an automobile lamp safety circuit in which an indication or warning is given when a stop lamp fails to be energized upon actuation of a stop lamp switch and also gives an indication when the stop lamp switch fails in either the open or the closed position that includes an interrogation or prove out circuit that may be employed to check for failures in the safety circuit prior to each use.

Other objects and attendant advantages of the invention will become more readily apparent as the specification is considered in connection with the attached drawings in which—

FIGURE 1 is a circuit diagram of one embodiment of the invention;
FIGURE 2 is a circuit diagram of another embodiment of the invention, and
FIGURE 3 is an elevational view of the brake pedal and actuating means for actuating the stop lamp switches of the present invention.

Referring now to the drawings in which like reference numerals designate like parts throughout the several views thereof, there is shown in FIGURE 1 a circuit diagram of one embodiment of the invention. In this embodiment of the invention a pair of stop lamps 11 and 12 are energized from a source of direct current electrical energy, battery 13, through a stop lamp switch 14. The battery 13 has a negative terminal 15 connected to ground through a lead 16, and a positive terminal 17 connected to an ignition switch 18. The ignition switch 18 is connected to a junction 21, and the junction 21 is connected to a first contact 22 of the stop lamp switch 14 through a fuse 23 and lead 24. The stop lamp switch 14 has a second contact 25 adapted to be bridged by a conductive plate 26.

A differential relay 27 is included in the circuit shown in FIGURE 1. This differential relay is preferably a reed switch that is well known to those skilled in the art. It includes a first coil or winding 28, a second coil or winding 31 and a set of contacts 32. The set of contacts 32 includes a first contact 33 and a second contact 34. The first contact 33 is connected to the first contact 22 of the stop lamp switch 14 through a lead 35. The second contact 34 is connected to an indicator or warning lamp 36 through a lead 37. The indicator or warning lamp 36 is also connected to ground through a lead 38.

The second contact 25 of the stop lamp switch 14 is connected to one terminal of the second coil or winding 31 of the differential relay 27 through a lead 41. The other terminal of the second coil or winding 31 is connected to a junction 42 through a lead 43, a dual intensity resistor 44 shunted by a switch 45 and a lead 44. The junction 42 is connected to stop lamp 11 through a lead 47 and is also connected to the stop lamp 12 through a lead 48. The other terminals of the stop lamps 11 and 12 are grounded through leads 51 and 52 respectively.

The junction 21 is also connected to a first contact 53 of a secondary or auxiliary stop lamp switch 54 through a circuit breaker 55. The secondary or auxiliary stop lamp switch 54 also includes a second contact 56 and a conductive member 57 for bridging the contacts 53 and 56. The second contact 56 is connected to one terminal of the first coil or winding 28 of the differential relay 27 through a lead 58. The other terminal of the first coil or winding 28 is connected to ground through a lead 61 and a resistor 62.

Referring now to FIGURE 2, there is shown another embodiment of the invention in which an interrogation circuit has been added to the circuit of FIGURE 1 to prove out the warning or indicator lamp 36 and the differential relay or reed switch 27. The purpose of this circuit is to determine whether the warning or indicating lamp 36 and the differential relay are in proper working order. This circuit takes the form of a third coil or winding 71 included as an integral part of differential relay or reed switch 27. This third winding or coil 71 has one terminal thereof connected to a junction 72 through a lead 73, a parking lamp switch 74 and a lead 75. The other terminal of the third coil or winding 71 is connected to parking lamps 76 and 77 through a lead 78, and junction 81. The other terminals of the parking lamps 76 and 77 are connected to ground by leads 82 and 83 respectively. The circuit in FIGURE 2 also differs from the circuit in FIGURE 1 in the circuit connection employed to energize the first contact 33 of the set of contacts 32. In this case, the first contact 33 is connected to lead 58 through a lead 84 rather than being connected to the first contact 22 of the stop lamp switch 14 as disclosed in FIGURE 1.

FIGURE 3 shows a conventional mechanism for actuating or closing the stop lamp switch 14 and the secondary or auxiliary stop lamp switch 54. As is conventional for actuating a stop lamp switch, this mechanism includes a brake pedal 86 that actuates a piston contained within a master cylinder 87 of the automobile hydraulic brake system. The stop lamp switch 14 and the auixlary or secondary stop lamp switch 54 are conventional in construction and are of the common hydraulically actuated type. As shown here, both the switches 14 and 54 are connected to be actuated or closed by the fluid pressure developed in the master cylinder 87 when the operator of the vehicle depresses the brake pedal 86.

Referring back to FIGURE 1, the first winding or coil 28 and the second coil or winding 31 of differential relay or switch 27 are wound to produce opposing magnetic fields when they are energized so that if equal current flows through these two windings, assuming they have equal turns, the net magnetomotive force will be zero and the set of contacts 32 will remain open. To produce this set of conditions the differential relay or reed switch 27 may be constructed so that each winding or coil 28 and 31 contains 30 turns. The differential relay or reed switch 27 may be designed to stay open until a net magnetomotive force of approximately 40 ampere turns is generated in the coils or windings 28 and 31.

During daytime operations, the switch 45 is closed so that the dual intensity resistor 44 is shorted out thereby producing the higher level of illumination of the stop lamps 11 and 12. The depressing of the pedal 86 will close stop lamp switch 14 and the auxiliary lamp switch 54. The stop lamps 11 and 12 will then be energized from the source of electrical energy 13 through the stop lamp switch 14 and the second coil or winding 31 of the differential relay or reed switch 27, thereby generating a given number of ampere turns of magnetomotive force in the coil 31. The first winding or coil 28 will be energized from the battery 13 through the secondary or winding stop lamp switch 54. For example, if each coil has 30 turns and the battery 13 has a terminal voltage of approximately 12 volts the resistance of the second coil or winding 31, the lamps 11 and 12 and the interconnecting switches and leads may be such that 4.5 amperes flows in the circuit thereby producing 135 ampere turns of magnetomotive force. The coil 28 and the resistor 62 are designed so that approximately 4 amperes flows in this circuit thereby producing 120 ampere turns of magnetomotive force in the opposite direction to the magnetomotive force generated in the first winding or coil 28. This leaves a net, or difference, of 15 ampere turns and the contacts 32 will remain open and hence the indicator or warning lamp 36 will not be energized.

During night time operations, the switch 45 is opened and the dual intensity resistor 44 is placed in series with the second winding or coil 31 of the differential relay 27 and the stop lamps 11 and 12. This reduces the current flow through the second coil or winding 31 and the stop lamps 11 and 12 to the point where 108 ampere turns of magnetomotive force are generated in the second winding or coil 31. At this time the same number of ampere turns, 120, of magnetomotive force are generated in the first winding or coil 28. This leaves a net or difference of 12 ampere turns, and the contacts 32 will remain open.

Should either of the stop lamps 11 or 12 burn out, it can be appreciated that the resistance in series with the second coil or winding 31 will be increased. During daytime operation, when the switch 45 is closed, this increase will drop the magnetomotive force generated in the winding 31 to approximately 67½ ampere turns thereby leaving a difference of 52½ ampere turns in the differential relay 27 since the 120 ampere turns generated by winding 28 will remain constant. This is sufficient magnetomotive force to close the contacts 33 and 34 and to energize the warning lamp or indicator 36 from the source of electrical energy 13 through the closed contacts and the circuits previously described. During nighttime operations, when dual intensity resistor 44 is in series with stop lamps 11 and 12 and with second winding or coil 31, if one of the lamps 11 and 12 burns out, the magnetomotive force generated in the second winding or coil 31 is reduced to 54 ampere turns. This leaves a difference or net of 66 ampere turns in the differential relay 27. The contacts 33 and 34 will therefore be closed and the indicator or warning lamp 36 will be energized. If both of the stop lamps 11 and 12 burn out, the second coil or winding 31 will be open circuited and the 120 ampere turns of magnetomotive force generated in the first winding or coil 28 will close the set of contacts 32 and energize warning or indicator lamp 36.

It is evident that the number of turns in the first and second windings 27 and 31 could be different and that the current flows in these windings could be adjusted by resistance changes to produce the proper actuation of the differential relay or reed switch 27.

As previously pointed out, the circuit of this invention will give a warning or indication when the stop lamp switch 14 has failed in either the open or closed position. For example, if the stop lamp switch 14 fails in the closed position the second coil or winding 31 of the differential relay will be continuously energized regardless of the position of the brake pedal 86. When the brake pedal 86 is not depressed, however, the auxiliary or secondary stop lamp switch 54 will be open and the coil 28 will not be energized. The current flow through the winding 31 will, therefore, actuate the differential relay or reed switch 27 thereby closing the set of contacts 32 and energizing the indicator or warning lamp 36 from the source of electrical energy 13.

On the other hand, if the stop lamp switch 14 fails in the open position so that it does not close or complete a circuit even when the brake pedal 86 is depressed, current will not flow through the winding 31 regardless of the position of the brake pedal. When the brake pedal is depressed, however, the auxiliary or secondary switch 54 will be closed and the first coil or winding 28 of the differential relay or reed switch 27 will be energized thereby actuating the differential relay or reed switch. The set of contacts 32 will be closed, thereby energizing the warning lamp or indicator lamp 36 from the battery 13.

It can also be appreciated that the circuit of FIGURE 1 will give an indication when the auxiliary or secondary stop lamp switch 54 fails in either the open or closed position. If the auxiliary or secondary stop lamp switch 54 fails in the open position, the second coil or winding 31 wil be energized when the brake pedal 86 is depessed, but the first coil or winding 28 will not. This will close the set of contacts 32 and actuate the warning or indicating lamp 36. If the auxiliary or stop lamp switch 54 fails in the closed position, the first winding or coil 28 will be energized continuously, but the second coil or winding 31 will not be energized when the brake pedal is not depressed. Thus when the brake pedal 86 is not depressed, the magnetomotive force generated in the first winding or coil 28 will close the set of contacts 32 and the warning or indicator lamp 36 will be energized.

The embodiment of FIGURE 2 operates in much the same way as the embodiment of FIGURE 1 except that it provides the circuit of FIGURE 1 with a means for interrogating that circuit to determine whether the indicating or warning lamp 36 and the differential relay or reed switch 27 are in proper operating condition. To provide such a means the third coil or winding 71 of the reed switch is merely positioned in series with the parking lamp switch and the parking lamps of the automotive vehicle. To interrogate this system, the parking lamp switch 74 is thrown to the "on" position and the brake pedal 86 is depressed. The magnetomotive forces created by the coils 28 and 31 substantially cancel each other and the magnetomotive force generated in third coil or winding 71, that may be of a magnitude of approximately 55 ampere turns, actuates the differential relay 27 to close the set of contacts 32. The warning lamp 36 is thereby energized from the lead 58. This lead 58 will be energized since the secondary or auxiliary stop lamp switch 54 has been closed. It is therefore necesary to depress the brake pedal 86 to close auxiliary stop lamp switch 54 and stop lamp switch 14 when it is desired to interrogate the circuit. If the warning lamp 36 fails to light at this time, it indicates to the driver that either the warning lamp 36 is burned out, or the differential relay has become inoperative or some other part of the circuit has malfunctioned.

In other respects, the circuit operates the same way as that of FIGURE 1 except that the contact 33 of the set of contacts 32 is energized through the auxiliary stop lamp switch 54 and the lead 58 rather than being connected to the contact 22 of stop lamp switch 14. Because the set of contacts 32 are energized through the auxiliary or secondary stop lamp switch 54 it can be appreciated that the safety circuit of FIGURE 2 will not give an indication should the auxiliary or secondary stop lamp switch fail in the open position. It will, however, give an indication for any of the other failures described in connection with the description of the circuit of FIGURE 1, failure of either or both stop lamps 11 and 12, failure of stop lamp switch 14 in either the open or closed position and failure of the auxiliary stop lamp switch in the closed position.

It can be appreciated that the invention provides an automotive lamp safety circuit in which an indicator or warning lamp will be energized in the event of the failure of either of the stop lamps of the vehicle and in which such a warning lamp or indicator will be energized if the stop lamp switch that energizes the stop lamp fails in either the open or the closed position. In addition, the invention provides a means for interrogating the safety circuit to determine if it is in proper working order.

It will be understood that the invention is not to be limited to the exact construction shown and described and that various changes and modifications may be made without departing from the spirit and scope of the invention as defined in the appended claims.

We claim:

1. In an automobile electrical system, a stop lamp, a source of electrical energy, a brake pedal, a stop lamp switch connected to said stop lamp and said source of electrical energy, said stop lamp switch being operable between an open and a closed position, means coupling said stop lamp switch and said brake pedal for closing said stop lamp switch and completing a circuit from said source of electrical energy to said stop lamp when said brake pedal is depressed, an indicator lamp, an auxiliary stop lamp switch connected to said source of electrical energy, said auxiliary stop lamp switch being operable between an open and a closed position, means coupling said auxiliary stop lamp switch and said brake pedal for closing said auxiliary stop lamp switch and completing a circuit through said auxiliary stop lamp switch from said source of electrical energy when said brake pedal is depressed, an electrical switch means coupling said indicator lamp, the circuit through said stop lamp switch and said stop lamp and the circuit through said auxiliary stop lamp switch for energizing said indicator lamp when said stop lamp fails, or when either said auxiliary stop lamp switch or said stop lamp switch fails in either the open or closed position.

2. The electrical system of claim 1 in which said electrical switch means includes means for checking the operability of said indicator lamp and said electrical switch means.

3. In an autombile electrical system, a pair of stop lamps, a source of electrical energy, a brake pedal, a stop lamp switch connected to said stop lamps and said source of electrical energy, said stop lamp switch being operable between an open and a closed position, means coupling said stop lamp switch and said brake pedal for closing said stop lamp switch and completing a circuit from said source of electrical energy to said stop lamps when said brake pedal is depressed, an indicator lamp, a differential relay including a first winding, a second winding and a set of contacts, said set of contacts being connected in circuit with said indicator lamp and said source of electrical energy, an auxiliary stop lamp switch, means connecting said first winding to said source of electrical energy through said auxiliary stop lamp switch, said second winding being connected in circuit with said stop lamp switch and said pair of stop lamps, the current flow through said first and said second windings creating opposing magnetomotive forces such that said contacts remain open when said system is in proper operating condition, but creating a net magnetomotive force of sufficient magnitude to close said set of contacts and energize said indicator lamp when either of said stop lamps fail or said stop lamp switch fails in either the open or closed position.

4. The automobile electrical system of claim 3 that includes an interrogation circuit comprising a third winding coupled to said differential relay, a circuit including a switch connecting said third winding to said source of electrical energy, means connecting said set of contacts to be energized through said auxiliary stop lamp switch whereby said indicating lamp will be energized when said switch is closed and said brake pedal is depressed if said indicating lamp and said differential relay are in proper working order.

5. In an automobile electrical system, a stop lamp, a source of electrical energy, a brake pedal, a stop lamp switch connected to said source of electrical energy, an auxiliary stop lamp switch connected to said source of electrical energy, both of said switches being operable between a closed and an open position by depression and release of said brake pedal, a differential relay including a first winding, a second winding and a set of contacts adapted to be closed by a difference of selected magnitude in magnetomotive force developed in said first and said second windings, said first winding being connected in series relationship with said auxiliary stop lamp switch, said second winding being connected in series with said stop lamp switch and said stop lamp, an indicating lamp, said indicating lamp being connected in circuit with said set of contacts adapted to be energized from said source of electrical energy when said set of contacts is closed, whereby said indicating lamp will be energized when said stop lamp fails or when either of said stop lamp switch or said auxiliary stop lamp switch fails in either the open or the closed position.

6. In an automobile electrical system, a stop lamp, a source of electrical energy, a brake pedal, a stop lamp switch connected to said source of electrical energy, an auxiliary stop lamp switch connected to said source of electrical energy, both of said switches being operable between a closed and an open position by depression and release of said brake pedal, a differential relay including a first winding, a second winding, a third winding and a pair of contacts, said first and said second windings being wound to create opposing magnetamotive forces when energized, said pair of contacts adapted to be closed by a net magnetomotive force of selected magnitude developed in one or more of said first, second or third windings, said first winding being connected in series with said auxiliary stop lamp switch, said second winding being connected in series with said stop lamp, a third switch connected to said source of electrical energy, said third switch being connected in series with said third winding of said differential relay, an indicating lamp connected to said pair of contacts and to said source of electrical energy, said indicating lamp adapted to be energized from said source of electrical energy when said contacts are closed, whereby said indicating lamp will be energized when said stop lamp fails or when said stop lamp switch fails in either the open or closed position, or when said third switch is closed.

7. In an automobile electrical system, a stop lamp, a source of electrical energy, a brake pedal, a stop lamp switch connected to said source of electrical energy, an auxiliary stop lamp switch connected to said source of electrical energy, both of said switches being operable between a closed and an open position by depression and release of said brake pedal, a first circuit means completing a circuit from said source of electrical energy through said stop lamp switch and said stop lamp when said brake pedal is depressed, a second circuit means completing a circuit from said source of electrical energy through said auxiliary stop lamp switch when said brake pedal is depressed, an indicating lamp, and an electrical switching means having a first input coupled to said first circuit means, a second input coupled to said second circuit means and an output coupled to said indicator lamp for energizing said indicator lamp when said stop lamp fails or when either said stop lamp switch or said auxiliary stop lamp switch fails in either the open or closed position.

References Cited in the file of this patent

UNITED STATES PATENTS 2,731,628     Campanella _____ Jan. 17, 1956